United States Patent Office 3,182,148
Patented May 4, 1965

3,182,148
AUTOMATIC PRESSURE SWITCH FOR AUTOMATICALLY CONTROLLING THE COMPRESSOR USED IN VARIOUS REFRIGERATORS
Shigeo Mamiya, Saginomiya, Nakano-ku, Tokyo, and Takeshi Odashima, Narimune, Suginami-ku, Tokyo, Japan, assignors to Saginomiya Seisakusho Co., Ltd., Tokyo, Japan
Filed Sept. 7, 1961, Ser. No. 136,499
Claims priority, application Japan, Sept. 16, 1960, (utility model) 35/46,714
4 Claims. (Cl. 200—81)

This invention pertains, in general, to pressure actuated switching mechanism; and, more particularly, to a pressure actuated switching mechanism comprising two pressure actuated switches which are adapted for use in, for example, refrigeration systems. One pressure actuated switch is used for controlling the pressure of the refrigerant; and, the other pressure actuated switch is used for regulating the refrigeration system, in the event that excessive pressures would render the system unsafe.

Although the pressure actuated switching mechanism of the present invention is hereinafter described as being especially suited for use in a refrigeration system, it is to be understood that the application of the pressure actuated switching mechanism is not limited to use in refrigeration systems.

One object of the present invention is to provide a pressure actuated switching mechanism comprising two pressure actuated switches connected in parallel wherein one pressure actuated switch controls a working substance such as a refrigerant and the other pressure actuated switch regulates the system, in the event that dangerously high pressures occur.

Another object of the present invention is to provide an automatic pressure switch which is compact and simple in construction, said pressure switch comprising two switches which are miniature switching mechanisms.

Still another object of the present invention is to provide an automatic pressure switch having a pressure reacting mechanism to be connected to the high pressure side of the compressor and a pressure control mechanism to be connected to the low pressure side thereof, said two mechanisms being installed in parallel.

The aforementioned objects, the various features and advantages, as well as a fuller appreciation of the invention are to be had by referring to the following detailed description of one embodiment thereof as read in conjunction with the drawings, in which.

Figure 1:
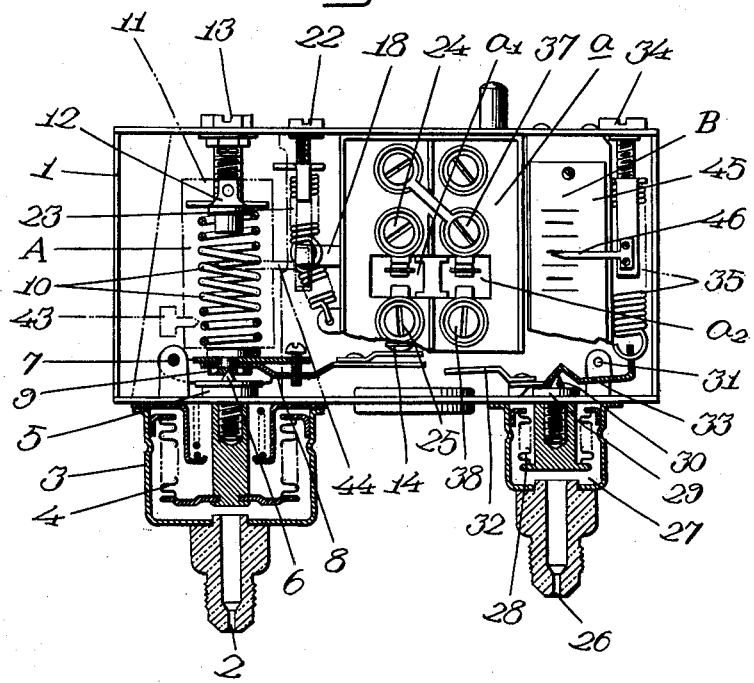
FIG. 1 is a sectional elevational view of the pressure actuated switching mechanism according to the present invention.
Figure 2:
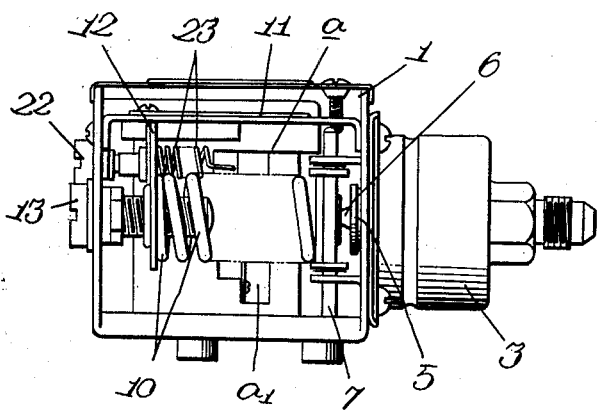
FIG. 2 is a side elevation view of the switching mechanism of FIG. 1 as viewed from the left side of FIG. 1.

As is illustrated in FIGS. 1 and 2, on one side of a casing 1 there is a pressure chamber 3 having a pressure inlet 2. Within said chamber 3, there is provided a low pressure bellows 4 being fixed thereto and a pressure sensitive lever 5 is provided thereon, the pointed tip 6 of said pressure sensitive lever 5 being made to contact through a socket plate 9 with a sensitive plate 8 which is rotatably pivoted at an axle 7. To said sensitive plate 8, a tension spring 10 is made to contact under pressure and at the base of said tension spring 10, there is provided a support plate 12 having an indicator plate 11 attached thereto. Against said support plate 12, there is also provided an adjusting screw 13 in order to vary the pressure of said tension spring 10 and to move simultaneously the indicator plate 11 vertically.

The sensitive plate 8 has an end which makes contact with a button 14 of No. 1 switch $a_1$ of a microswitch unit $a$ and on the back of a change-over contact piece 16 having a quick action spring 15, there is projected a rod 18 attached to said button 14 having a spring 17 thereon, which reacts to automatically restore said rod 18 to its original position.

The rod 18 is made to hit a lever 20 which is pivoted by an axle 19 and having an adjustable stopper 21 at an end thereof and the other end of said lever 20 is hooked to a tension spring 23 which is fixed by an adjustable screw 22 on the casing 1 and thus the low pressure switching mechanism A is constituted enabling adjustment of the difference of the operating pressure in making and breaking of the changeover contact piece 16.

Now explaining the operation of the low pressure switch mechanism A which is comprised of the elements hereinbefore described, when the pressure inlet 2 of the apparatus is connected to the low pressure side, that is, the suction side of the compressor of a refrigerator or the like, the pressure sensitive rod 5 presses the pressure sensitive plate 8 pivoted by the axle 7 by the pointed tip 6 thereof and when the pressure overcomes the force of the spring 10, the sensitive plate 8 begins to rotate. In this case as the tip of the sensitive plate 8 is kept in contact with the button 14 of the No. 1 switch $a_1$, said button 14 is also pressed and the change-over contact piece 16 is operated to effect the change-over of the switch.

In the course of pressing the button 14 as described above, however, said button 14 pushes the change-over contact piece 16 against the tension of the spring 17 on the rod 18. At the outset and as the rod 18 is made to advance further, it hits on the lever 20, and accordingly, the change-over contact piece 16 is shifted only when the pressure given on the button 14 overcomes the tension of the tension spring 23 by the action of the quick action spring 15 changing its contact point from 24 to 25. When the pressure on the button 14 is decreased, the tension of the tension spring 23 and the pressure of the pressing springs 10, 17 are made to operate and the tip of the sensitive plate 8 is gradually restored to the original position. As the lever 20 is provided with the stopper 21, however, the tension of the tension spring 23 is held by said stopper 21 at a certain point and thereafter the sensitive plate 8 receives only the pressure of the pressing springs 10 and 17.

Accordingly, as the operating pressure is further decreased and as soon as the total pressure of the pressing springs 10 and 17 overcomes the operating pressure, said No. 1 switch $a_1$ changes its contact point from 25 to 24 thus returning to the original position.

Accordingly, while the tension of the tension spring 23 affects the making pressure, the same does not affect the breaking pressure and thus by adjusting the tension of the tension spring 23 by rotating the adjusting screw 22 thereof, the difference between the making pressure and the breaking pressure can be adjusted and furthermore by adjusting the pressure of the pressing spring 10 by rotating the adjusting screw 13 thereof, the making and breaking pressure can be adjusted at the same time and the low pressure switch A is capable of controlling the operation of the compressor automatically in order to keep the temperature of the refrigerator proper and constant.

Furthermore, on the other end of the casing 1, there is provided in parallel with said low pressure mechanism a high pressure chamber 27 having a pressure inlet hole 26 and within said pressure chamber 27, there is installed a high pressure bellows 28 fixed thereto. To said high pressure bellows, a pressure sensitive lever 29 is attached and a pointed tip 30 thereof is fitted to a groove 33 of a rotating plate 32 pivoted by an axle 31 and an end of said rotating plate 32 is hooked on a tension spring 35 having an adjusting screw 34. The other end of the rotating plate 32 is made to face with the head of a button 36 provided on No. 2 switch $a_2$ of the microswitch unit $a$ and thus the high pressure switch B is constituted.

Figure 4:
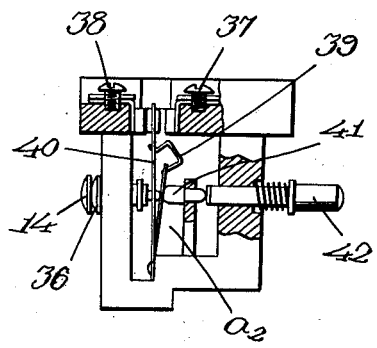
FIG. 4 is another sectional view of the miniature switch of FIG. 1.
Figure 3:
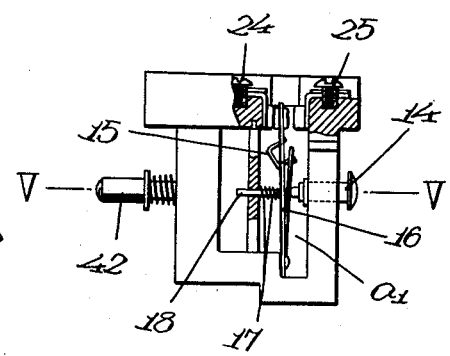
FIG. 3 is a sectional view of the miniature switch of the pressure actuated switching mechanism of FIG. 1.
Figure 5:
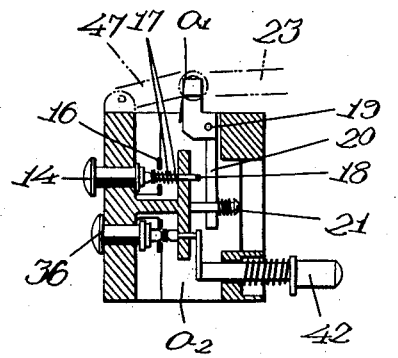
FIG. 5 is a section of the miniature switch of FIG. 3 as viewed along the section line V—V of FIG. 3.

To the button 36, a change-over contact piece 40 provided with a quick action spring 39 for changing the contact point from 37 to 38, is made to contact and on the opposite side of said change-over contact piece 40, there is provided a press-button 42 for restoring the change-over contact piece 40 to its original position with an auxiliary piece 41 inbetween, said press-button 42 being projected out of the casing 1. When the change-over contact piece 40 is brought to the position as shown in FIG. 4, said press-button 42 is pressed and the switch is restored to its original position. While it is not shown in the drawings, it is, of course, possible to provide an automatically returning mechanism as in the case of the low pressure switch A instead of the push button 42 described above.

Furthermore, in the attached drawings, 43 is a stationary indicator positioned above the scale plate 11 of the low pressure switch A and 44 is a movable indicator mounted on the tension spring 23, both of which serve to adjust the pressure. 45 is a scale plate of the high pressure switch B, 46 a movable indicator mounted on the tension spring 35, and 47 an auxiliary spring respectively.

As the present invention is constituted as described above, by connecting the low pressure switch to the suction side, that is, the low pressure side of the compressor of various refrigerators, the pressure can be maintained at a constant value and furthermore by connecting the high pressure switch to the outlet side or the high pressure side, when an abnormal high pressure is caused, said switch is activated and an alarm circuit connected to the high pressure switch is activated or a circuit breaker of the compressor is set to operation and thus any unforeseen accident can be prevented. Thus, the switch according to the present invention can be a pressure switch for maintaining a constant pressure in various pressure tanks as well as a safety switch.

Furthermore, according to the present invention, No. 1 and No. 2 switches constitute one unit microswitch and as the same is made extremely compact, the switch according to the present invention is endowed with various distinctive features such as that the same can be formed in an extremely compact size and the like.

Although one embodiment of the pressure actuated switching mechanism of the present invention has been described, hereinbefore, as well as illustrated in the accompanying drawings, it is to be understood that many changes, rearrangements of parts, as well as modifications of the various parts may be made without departing from the spirit and scope of the invention which is, hereinafter, defined by the appended claims.

Having thus described our invention, what we claim as new and desire to secure by Letters Patent is:

1. Pressure-actuated switching apparatus comprising, in combination, means defining a low pressure chamber and a high pressure chamber; a first toggle switch operatively associated with said low pressure chamber; a second toggle switch operatively associated with said high pressure chamber; each of said toggle switches including a movable contact member operatively associated with a pair of fixed contacts, said movable contacts being constructed and arranged for snap disengagement of one fixed contact and snap engagement of the other fixed contact; a first switch operator operatively associated with the movable contact of said first switch; first pressure-responsive movable means subjected to the pressure in said low pressure chamber; a first intermediate operating member interposed between said first pressure-responsive movable means and said first switch operator and effective, upon an increase in pressure in said low pressure chamber to a predetermined value, to actuate said first switch operator to snap the movable contact of said first switch to the "make" position; first spring means operatively associated with said first intermediate operating member and opposing movement thereof by said first pressure-responsive movable means; first adjusting means operatively associated with said first spring means to adjust the bias thereof to, in turn, adjust the pressure at which said first switch is snapped to the "make" position; a first movable element engaged by the movable contact member of said first switch and moved by the latter when snapped to the "make" position; second spring means associated with said first movable element and resisting movement of the movable contact member of said first switch to the "make" position; a second movable element engageable by said first movable element after a predetermined movement of the movable contact member of said first switch; third spring means operatively associated with said second movable element and resisting movement thereof by said first movable element; second adjusting means operatively associated with third spring means and effective to adjust the bias thereof; fourth spring means operatively associated with said second movable element and opposing the bias of said third spring means; whereby all of said spring means are operative to control the force moving the movable contact member of said first switch to the "make" position, said fourth spring means rendering ineffective said third spring means after a predetermined movement of the movable contact member of said first switch toward the "break" position so that the biasing force toward the "break" position is determined solely by said first and second spring means; whereby the "make" bias and the "break" bias of said first switch may be independently preset; a second switch operator operatively associated with the movable contact of said second switch; second pressure-responsive movable means subjected to the pressure in said high pressure chamber; and a second intermediate operating member interposed between said second pressure-responsive movable means and said second switch operator and effective, upon a predetermined increase in pressure in said high pressure chamber, to actuate said second switch operator to snap the movable contact member of said second switch to the "make" position.

2. Pressure-actuated switching apparatus, as claimed in claim 1, including reset means operatively associated with the movable contact member of said second switch to reset said second switch to the "break" position.

3. Pressure-actuated switching apparatus, as claimed in claim 1, including fifth spring means operatively associated with said second intermediate operating member and resisting movement thereof by said second pressure-responsible movable means in the switch "make" direction; and third adjusting means operatively associated with said fifth spring means and effective to adjust the bias thereof.

4. Pressure-actuated switching apparatus, as claimed in claim 1, in which said first intermediate operating member is pivoted at one end and has a free end engaged with said first switch operator; said first pressure-responsive movable means engaging said first intermediate operating member intermediate the ends thereof and in alignment with said first spring means.

References Cited by the Examiner

UNITED STATES PATENTS 2,183,775 12/39 Pike _____ 200—81
2,330,832 10/43 Malone et al. _____ 200—83
2,941,055 6/60 Sussin _____ 200—81

BERNARD A. GILHEANY, Primary Examiner.

WALTER STOLWEIN, Examiner.